United States Patent [19]

Mir et al.

[11] 4,380,023
[45] Apr. 12, 1983

[54] ELECTRONIC IMAGING APPARATUS WITH LIGHT VALVE AREA ARRAYS

[75] Inventors: José M. Mir, Rochester; Jerry R. Varner, Fairport; Clark N. Kurtz, Rochester, all of N.Y.

[73] Assignee: Eastman Kodak Company, Rochester, N.Y.

[21] Appl. No.: 230,097

[22] Filed: Jan. 29, 1981

[51] Int. Cl.³ .......................... H04N 1/46; H04N 1/22
[52] U.S. Cl. .......................................... 358/75; 358/60
[58] Field of Search ....................... 358/60, 61, 75, 78, 358/80, 213, 285, 294, 296, 300, 302; 355/4, 5, 18, 32, 37, 38, 67, 70, 71; 350/370, 374, 378, 380, 400

[56] References Cited

U.S. PATENT DOCUMENTS

| | | | |
|---|---|---|---|
| 3,930,119 | 12/1975 | Schmidt | 358/285 |
| 4,129,357 | 12/1978 | Frosch | 350/403 |
| 4,229,095 | 10/1980 | Mir | 358/75 |
| 4,294,524 | 10/1981 | Stolov | 358/60 |
| 4,316,196 | 2/1982 | Jacobs | 350/356 |

Primary Examiner—Michael A. Masinick
Attorney, Agent, or Firm—John D. Husser

[57] ABSTRACT

Two panels, each having a plurality of electrically-addressable, parallel light valve strips are arranged along an optical axis between entrance, exit and intermediate polarizing means. The strips of the respective panels are generally perpendicular and the entrance and exit polarizing means have their directions of polarization mutually aligned and perpendicular to the intermediate polarizing means. By sequentially activating the strips of a first panel and imagewise addressing the strips of the other panel during each such sequential activation an area image is formed.

13 Claims, 2 Drawing Figures

ELECTRONIC IMAGING APPARATUS WITH LIGHT VALVE AREA ARRAYS

CROSS-REFERENCE TO RELATED APPLICATIONS

Reference is made herein to U.S. patent application Ser. No. 230,099, entitled "Light Valve Imaging Apparatus Having Improved Addressing Electrode Structure" filed Jan. 29, 1981, in the names of J. M. Mir and J. R. Varner; U.S. patent application Ser. No. 230,095, entitled "Light Valve Imaging with Optimized Addressing Potential(s) to Reduce Inter-Pixel Nonuniformity", filed Jan. 29, 1981, in the name of J. M. Mir; U.S. patent application Ser. No. 230,092, entitled "Improved Light Valve Imaging Apparatus and Method for Providing Gray Scale", filed Jan. 29, 1981, in the name of J. M. Mir; U.S. patent application Ser. No. 230,096, entitled "Electronic Color Imaging Apparatus Having Improved Color Control Device", filed Jan. 29, 1981, in the name of J. M. Mir and U.S. patent application Ser. No. 230,089, entitled "Light Valve Imaging Apparatus Having Improved Optical Configuration", filed Jan. 29, 1981, in the name of J. R. Varner.

BACKGROUND OF THE INVENTION

1. Field of the Invention

The present invention relates to apparatus and method for forming an image (on a recording medium or for viewing) from an electrical signal and more particularly to improvements in electronic imaging apparatus and method of the kind using light valves.

2. Brief Description of the Prior Art

U.S. Pat. No. 4,229,095 discloses various embodiments of electronic color-imaging apparatus that utilize arrays of separately-addressable, pixel (picture element) sized, electro-optical means to effect multicolor exposure of panchromatic imaging media. One preferred kind of electro-optical means disclosed in that patent is a light valve comprising a panel of ferro-electric ceramic material, such as lanthanum doped lead zirconate titanate (PLZT) sandwiched between crossed polarizers and activated to operate in a quadratic Kerr cell mode. Thus an array of such light valves comprises a panel of PLZT material with a plurality of interleaved electrodes formed on one major surface in a manner facilitating the selective application of discrete electrical fields across (in a direction perpendicular to the direction of viewing) discrete surface areas of the plate. Upon application of such fields, the PLZT material becomes birefringent and rotates the direction of polarization of incident light by an extent dependent on the field magnitude. This results in the transmission of light through the PLZT panel and polarizers varying as a function of the electric fields. A color image is formed electronically by selectively opening and closing of such light valves in synchronization with the energization of red, green and blue exposing sources and according to the red, green and blue color information for the pixels of that image.

One preferred embodiment disclosed in the above-mentioned patent comprises a linear array of separately-addressable, light valve elements that are disposed in spaced transverse relation to the path along which a photosensitive imaging medium is fed. In this embodiment the pixels of the linear array are addressed concurrently, a line at a time, with image information and the movement of the imaging medium along its feed path is synchronized with successive actuations of the linear array. This embodiment of imaging apparatus is highly effective and advantageous in many applications; however, the requirement for relative movement between the image medium and linear light valve array gives rise to difficulties in certain applications.

Specifically, transverse banding artifacts (lines or streaks of different density extending transverse to the direction of relative motion between the imaging medium and linear array) sometimes occur because of improper synchronization between the electrical imaging signals and the physical motion between the image medium and imaging array. Such synchronization lapses, herein termed generally "flutter", can have many causes, e.g., imprecision of the movement of the imaging medium (such as can be caused by vibrations or "loose" tolerances) or variations in the frequency of the electrical signal (such as caused by imprecise movement of a recording medium on which the signal is stored). There are various synchronizing techniques to minimize these flutter artifacts; however, the remedies add to machine complexity and cost.

Also, imaging with linear arrays can give rise to longitudinal banding artifacts (lines or streaks of different density extending in the same direction as the relative motion between the linear array and the imaging medium) because of transmission non-uniformities between adjacent light valve elements in the linear array.

Further, although imaging with a linear light valve array is operative in a recording or printing mode, display imaging cannot be effected easily with a linear array.

SUMMARY OF THE INVENTION

It is a significant purpose of the present invention to provide new and useful light valve imaging apparatus and method which obviate or minimize the difficulties outlined above. It is a highly important aspect of the present invention that such apparatus and method provide significant advantages from the viewpoints of mechanical and electronic simplicity and from the viewpoint of ease of fabrication. Also, it is a related aspect of the present invention that such imaging apparatus can be advantageously incorporated in display and/or recording apparatus.

In general, the present invention accomplishes these advantageous features by means of a novel area light valve array which includes three light-polarizing means aligned along an optical axis and having interleaved therebetween two electro-optic area modulators, each comprising a plurality of discretely addressable strip portions that are activatable between birefringent and isotropic states in response to application and removal of an electric field. The entrance and exit polarizing means of the light valve array are oriented with the same direction of polarization and the intermediate polarizing means is oriented with its direction of polarization orthogonal to the other polarizing means. A first area modulator is illuminated through an entrance polarizer. Addressing means applies electrical activating fields sequentially to the different strip portions of one of the area modulators while concurrently applying electrical activating fields to the strip portions of the other of the area modulators in timed relation with the sequential field activations and in accordance with an electrical signal containing lines of image information.

In another advantageous aspect of the invention such an area light valve array is incorporated in image display and/or printing apparatus which includes means for producing an electrical signal carrying information indicative of one or a plurality of images and means for coupling such signal to the addressing means of such an array.

BRIEF DESCRIPTION OF THE DRAWINGS

The following description of preferred embodiments of the invention refers to the attached drawings wherein.

DETAILED DESCRIPTION OF THE PREFERRED EMBODIMENTS

Figure 1:
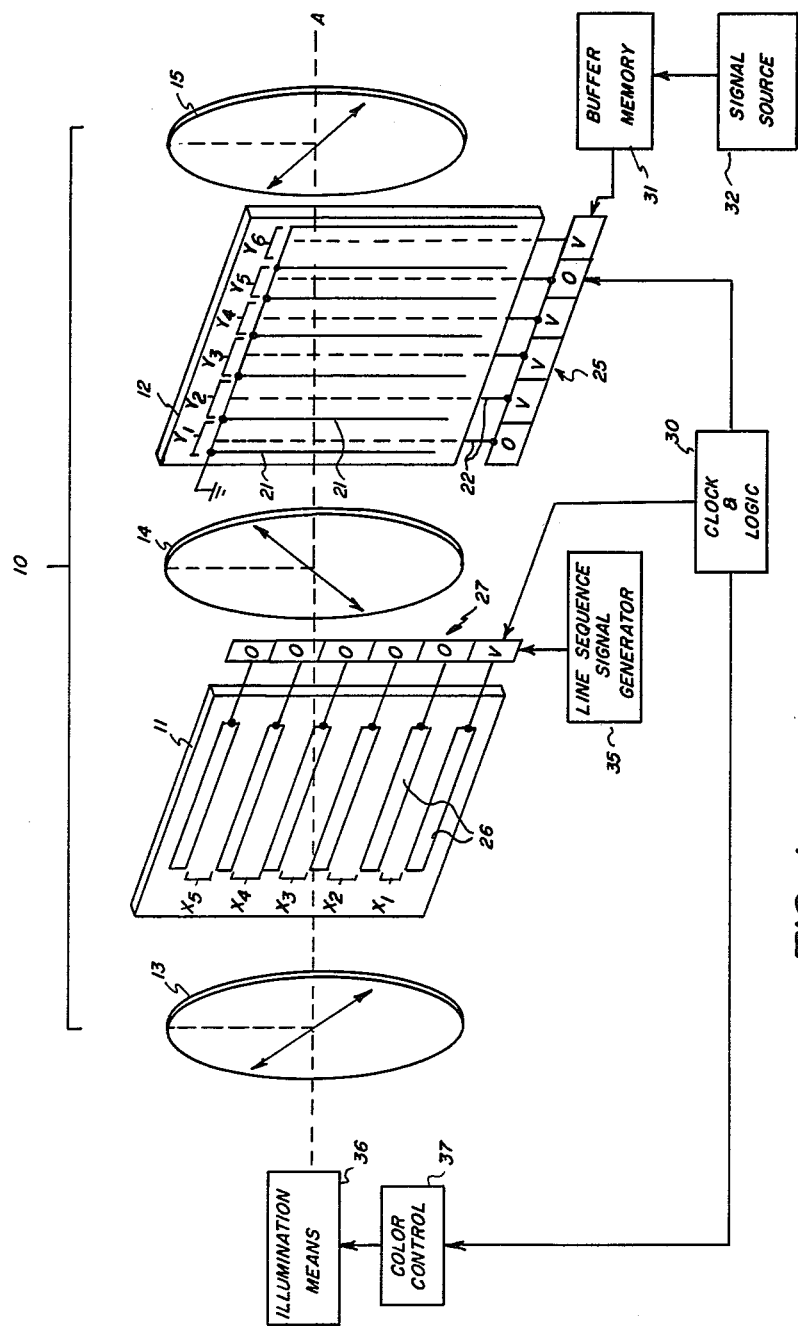
FIG. 1 is a schematic illustration showing one embodiment of light valve imaging device according to the present invention.

FIG. 1 schematically illustrates one area light valve array 10 and typical associated elements which can be utilized therewith to accomplish electronic imaging in accordance with the present invention. The array 10 comprises first and second area modulators 11 and 12 and entrance, intermediate and exit light polarizing means 13, 14 and 15. It will be appreciated that dimension and configuration of the area modulators and polarizing means will vary depending upon the application in which the array is to be used. Generally, the elements will be approximately uniform in their major dimension, the polarizing means 13-15 being schematically illustrated as circular in the drawing only to pictorially emphasize their function. The arrays and polarizing means are illustrated along a straight line optical axis; however, it will become clear that various mirrors, prisms, etc. could be arranged to define a different optical axis between these elements. Although not in a straight line relation such as shown in FIG. 1, those elements would be optically aligned.

The area modulators 11 and 12 are formed of electro-optic material of the type which transforms from a non-polar, optically-isotropic state to a polar, strongly-birefringent state when an electrical field is applied thereacross. PLZT ferroelectric ceramic of a kind known in the art (see e.g., U.S. Pat. Nos. 3,612,656; 3,998,523 and 4,053,207) is a preferred class of material; however, there are various other well known materials which exhibit the desired electro-optic behavior described above. A particularly preferred material is 9/65/35 PLZT. The area modulators can be formed as a unitary panel or as a plurality of separate panels, e.g., strips supported together to define a two-dimensional imaging area.

The polarizing means preferably are selected from various known materials such as sheet polarizer materials which exhibit dichroism e.g. Polaroid sheet polarizers. In certain applications other light polarizing techniques such as Nichol prisms and Brewster mirrors may be used.

As shown in FIG. 1, the area modulators and polarizing means are arranged along an optical axis A in a predetermined sequence and orientation. Specifically, the first area modulator 11 is located between entrance polarizing means 13 and intermediate polarizing means 14 and the second area modulator 12 is located between polarizing means 14 and exit polarizing means 15. It is to be noted that the polarizing means each can comprise multiple sheet polarizers with aligned directions of polarization as indicated. In this regard, we have found a remarkable increase in contrast ratio is obtained when intermediate polarizing means 14 comprises two sheet polarizers aligned e.g. in the direction indicated in FIG. 1. Usually it will be desirable to dispose the elements in closely spaced relation; however, in certain embodiments other light directing optical elements can be interposed along the optical path. As indicated in FIG. 1, it is important that the polarization direction of the entrance and exit polarizing means 13 and 15 be the same and that the polarization direction of the intermediate polarizing means 14 be orthogonal to those of the other polarizing means.

As shown in FIG. 1, each of the area modulators 11 and 12 is divided into a plurality of independently addressable strip portions ($X_1$-$X_5$ and $Y_1$-$Y_6$) by strip electrodes extending across their major surfaces in predetermined configurations. Referring first to modulator 12, it can be seen that a plurality of linear electrodes 21 extend from a common line along the top of the modulator in a parallel spaced relation to the bottom of the modulator, and a plurality of addressing electrodes 22 extend in parallel spaced relation toward the top of the modulator, interleaved between electrodes 21. Other preferred electrode structures are disclosed in U.S. patent application Ser. No. 230,099, entitled "Light Valve Imaging Apparatus Having Improved Addressing Electrode Structure" and filed Jan. 29, 1981, in the names of J. M. Mir and J. R. Varner.

In one mode for address the electrodes 21 can be coupled to a common source of reference potential, e.g. ground and the electrodes 22 selectively energized to an activating potential level. One preferred mode for activating such electrodes to an optimized potential level is disclosed in copending U.S. patent application Ser. No. 230,095, entitled "Light Valve Imaging with Optimized Addressing Potentials to Reduce Inter-Pixel Nonuniformity" and filed Jan. 29, 1981 in the name of J. M. Mir, which is incorporated herein by reference. Thus zones ($Y_1$-$Y_6$) between adjacent pair of electrodes 22 from light-modulating strip portions across the "Y" direction of the area array 10. An electrode addressing approach particularly useful for continuous tone imaging is disclosed in U.S. patent application Ser. No. 230,092, entitled "Improved Light Valve Imaging Apparatus and Method for Providing Gray Scale" and filed in the name of J. M. Mir, which is incorporated herein by reference.

The area modulator 11 has a slightly different electrode arrangement; however, it can also be formed like modulator 12 but with the strip portions in the "X" direction. Instead, in the illustrated embodiment, the modulator 11 comprises a plurality of separately-addressable linear electrodes 26 extending horizontally across the modulator and coupled to an addressing source 27 adjacent the modulator. To activate one of the light-modulating strip portions ($X_1$-$X_5$), it is necessary that the adjacent electrodes 26 defining that portion be at different potential levels to form the activating electrical field thereacross. This can be done in an electrically efficient fashion, which will be described subsequently, for the preferred embodiment disclosed.

However, first it should be noted that it is highly preferred according to the present invention that the fields applied across strip portions $X_1$-$X_5$ and $Y_1$-$Y_6$ be in a direction perpendicular to the optical axis A. Thus as used herein the phrase "transversely across" is used to distinguish this field direction in contrast to the direction across the thickness of the element (i.e., in a direction parallel to the optical axis A). The significance of this aspect is that this mode of field application results in light modulation in the transverse or Kerr mode rather than in the longitudinal or scattering mode. Although the longitudinal modulation mode may be useful for some applications, the high contrast ratios obtainable with the transverse mode make it highly preferable.

One preferred mode of operation of the above-described area light valve array will now be explained as it is effected by the related addressing and illuminating elements also shown schematically in FIG. 1. Thus, under the control of clock 30, buffer memory 31 outputs the pixel information for a line of image information, which it has received and stored from image signal source 32, to addressing source 25 (e.g., a shift register) for area modulator 12. During this same period line sequence generator 35 outputs a line signal to addressing source 27 (e.g., a shift register) for area modulator 11, also under the control of clock 30. Thereafter clock 30 initiates an address signal which causes the addressing sources 27 and 25 to energize electrodes $X_1$–$X_5$ and $Y_1$–$Y_6$ in accordance with the information clocked therein. At the same time clock 30 commands appropriate energization of illuminating means 36 to effect uniform illumination of modulator 11 through polarizing means 13 (with panchromatic or a particular color light depending on whether the application is black-and-white or color). U.S. Pat. No. 4,229,095 discloses means for providing a series of different color light pulses during a line exposure period and color control 37 in FIG. 1 can be constructed to effect such a function. Another preferred structure for providing such color light pulses is disclosed in U.S. patent application Ser. No. 230,096, entitled "Electronic Color Imaging Apparatus Having Improved Color Control Device", filed Jan. 29, 1981, in the name of J. M. Mir. Alternatively, the apparatus can effect sequential color separation page exposures in which instance color control 37 will maintain a given color for an entire page and then switch to a different color for re-imaging a photosensitive medium with that information. Of course in monochrome imaging color control 37 would not be required. Copending U.S. patent application Ser. No. 230,089, entitled "Light Valve Imaging Apparatus Having Improved Optical Configuration" and filed Jan. 29, 1981, in the name of J. R. Varner discloses one preferred technique for collimating light from illuminating means so as to be normal to the light valve ingress surface. Illuminating light control means of this kind are highly useful in the present invention and the teachings of that application are incorporated herein by reference.

Now, assuming the address source to be loaded with information as shown (i.e., "V"—energize the coupled electrode; "O"—do not energize the coupled electrode), the $Y_2$, $Y_3$, $Y_4$ and $Y_6$ pixels of row $X_1$ of the light valve array will transmit light and the $Y_1$ and $Y_5$ pixels of row $X_1$ will not. This can be explained as follows. In area modulator 11, only the electrodes defining row $X_1$ have a potential differential and thus an electrical field is present only transversely strip $X_1$. Polarized light directed onto the surface of modulator 11 thus passes through rows $X_2$–$X_5$ without modulation but such light passing through row $X_1$ is rotated 90° because that strip portion is now in its polar, birefringent state. Upon exiting modulator 11, the light from rows $X_2$–$X_5$ is blocked by crossed polarizing means 14, but the light exiting row $X_1$ (having been rotated 90°) passes polarizing means 14 and forms an illuminated strip (orthogonal to strips $Y_1$–$Y_6$) on modulator 12. By virtue of their addressed activation, strips $Y_2$, $Y_3$, $Y_4$ and $Y_6$ of modulator 12 are in the polar, birefringent state and rotate light passing therethrough 90°. Non-activated strips $Y_1$ and $Y_5$ do not rotate light falling thereon. Thus light passing activated strips passes polarizing means 15 (which is cross relative to polarizing means 14) and light passing non-activated strips is blocked by polarizing means 15. The above-described sequence can be repeated as appropriate to yield different color addressing or different density addressing of the pixels of line $X_1$ of the image to be formed. Upon completion of the imaging of line $X_1$, line sequence generator activates an input to addressing source to energize a different strip of modulator 11 (e.g., by actuating the shift register so that the first two elements thereof are "V"). New pixel information for line $X_2$ is input to source 25 and the activation stage is repeated as previously described. It will thus be appreciated by one skilled in the art that repetitive sequences such as described can effect imaging of a medium opposite exit polarizing means 15 without the need for relative movement between the light valve array and the imaging medium.

Figure 2:
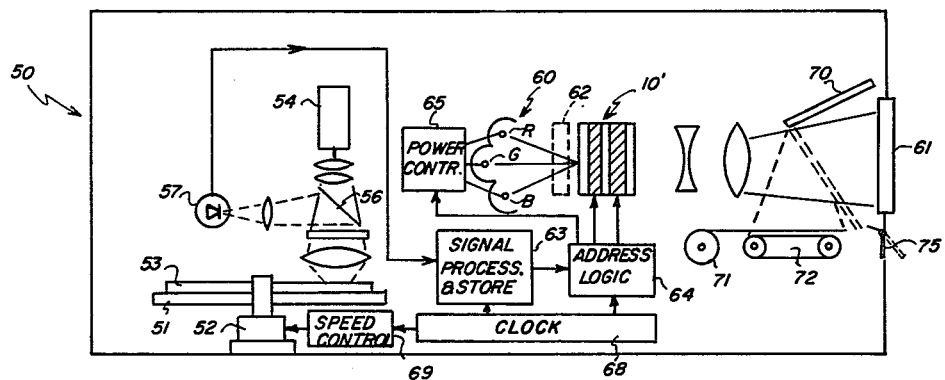
FIG. 2 is a schematic illustration showing another embodiment of light valve imaging device incorporated in a display and/or print apparatus.

Also, by referring to FIG. 2, it will be appreciated that a light valve array such as described with respect to FIG. 1 can be utilized to form a visual display as well as to image, e.g., on a stationary print medium. The embodiment of such apparatus 50 shown in FIG. 2 comprises an optical disc player as a source of image information; however, it will be appreciated that many other forms such as magnetic tape or disc or a broadcast video signal could be utilized. The optical disc player comprises a turntable 51 rotated by drive 52 and on which a disc 53 is supported. A light beam from laser 54 is tightly focused to a read spot by lens 55. The disc 53 illustrated is of the reflective type and contains millions of discrete micron-sized pits arranged in tracks. A pit parameter such as length or spacing carries the information indicative of the image. Light modulated by the pits is reflected back through lens 55 and reflected by beam-splitter 56 to photodetector 57 which converts the disc's light modulation to an electrical signal of the FM or digital type. Various optical disc reading devices of the kind described are known in the art and the details of these devices therefore need not be described further.

The image display and/or record apparatus 50 further comprises an area light valve array 10 like that described with respect to FIG. 1 interposed along an optical axis between an illuminating means 60 and a display surface 61. The illuminating means 60 is illustrated as separately actuatable sources R, G, B of red, green and blue light so that the apparatus 50 is adapted for electronic color imaging. Light collimating means 62 is located between illuminating means 60 and light valve 10'.

In operation, the electrical image signal from photodetector 57 contains the red, green and blue signal information for each line of the images recorded on disc 53. This information is processed by signal processing and store logic 63 and output to address logic unit 64 for energizing light valve 10' and light power control 65 in a mode similar to that previously described. Specifically, for each line $X_1 \ldots X_n$ of the array 10', the R, G and B pixel information is sequentially output to strip portions $Y_1 \ldots Y_n$ in timed relation with the red, green and blue illumination of array 10. The resulting light images exiting the area light valve array and imaged on display surface 61 thus comprise successive lines of red, green and blue pixels in accordance with the image information in the video signal. By appropriately timing the line rate, e.g., by means of clock 68 and speed control 69, a visible color image can be displayed on the display surface 61. If it is desired to produce a print of a viewed image, the electrical signal representative thereof can be stored in unit 64 and used to re-address the light valve 10'. In the print mode, mirror 70 is lowered to its dotted-line position and thus directs light exiting the light valve to a stationary print medium, e.g., instant color print film from a supply 71, located at a print station 72. After electronic color imaging by the light valve array as described, the print is fed out exit slot 75 which should be light tight.

The invention has been described in detail with particular reference to certain preferred embodiments thereof, but it will be understood that variations and modifications can be effected within the spirit and scope of the invention.

What is claimed is:

1. An electronic imaging device comprising:
   (a) first and second light-modulating panels each including (i) a plurality of generally coplanar and parallel light valve strips, formed of an electro-optic material of the type that is transformable by an electric field from a non-polar, isotropic state to a polar, birefringent state, and (ii) addressable means for selectively applying discrete electric fields transversely across respective strips, said panels being generally parallel, with their respective strips opposing and in a generally orthogonal relation; and
   (b) first, second and third light-polarizing means in optical alignment with said panels, said first and third polarizing means being located respectively on opposite sides of said panels and oriented with their directions of polarization generally aligned, said second polarizing means being located between said panels and oriented with its direction of polarization generally orthogonal to those of said first and third light-polarizing means.

2. An electronic imaging device comprising:
   (a) first and second light-valve, area arrays, each array comprising a plurality of parallel strip portions which are activatable between birefringent and isotropic states in response to application and removal of an electric field, said area arrays being aligned along an optical axis in an optically opposed relation with their respective said strip portions generally orthogonal optically;
   (b) addressable activating means for selectively applying discrete electrical fields transversely across respective strip portions; and
   (c) first, second and third light polarizing means aligned along said optical axis so that said first array is optically between said first and second polarizing means and said second array is optically between said second and third polarizing means, said first and third polarizing means being optically oriented with their directions of polarization generally aligned and parallel to the plane of said arrays and said second polarizing means being optically oriented with its direction of polarization generally parallel to the plane of said arrays and orthogonal to those of said first and third polarizing means.

3. Electronic imaging apparatus comprising:
   (a) first and second light-valve, area arrays, each array comprising a plurality of parallel strip portions which are activatable between birefringent and isotropic states in response to application and removal of an electric field, said area arrays being aligned along an optical axis in an optically opposed relation with their respective said strip portions generally orthogonal optically;
   (b) addressable activating means for selectively applying discrete electrical fields transversely across respective strip portions;
   (c) first, second and third light polarizing means aligned along said optical axis so that said first array is optically between said first and second polarizing means and said second array is optically between said second and third polarizing means, said first and third polarizing means being oriented with their directions of polarization generally aligned and parallel to the plane of said arrays and said second polarizing means being optically oriented with its direction of polarization generally parallel to the plane of said arrays and orthogonal to those of said first and third polarizing means;
   (d) means for illuminating said first array along said optical axis and through said first polarizing means; and
   (e) addressing means coupled to said activating means for:
      (1) sequentially applying an electrical field to successive strip portions of one of said arrays; and
      (2) concurrently applying electrical fields to the strip portions of the other of said arrays in timed relation with the sequential activations of said one array and in accordance with an electrical signal containing a line of image information.

4. The invention defined in claim 3 wherein said illuminating means includes color-control means for producing a plurality of different color periods during each of which light of a different color illuminates said first array.

5. The invention defined in claim 4 wherein said color-control means and said addressing means are synchronized so that a plurality of said sequential and said concurrent field applications occur during each color period to effect color separation page exposures.

6. The invention defined in claim 4 wherein said color control means and said addressing means are synchronized so that a plurality of said color periods and of said concurrent field applications occur during each sequential field application to effect successive multicolor line exposures.

7. The invention defined in claim 3 further comprising a display surface located along said optical axis to receive light exiting said third light polarizing means.

8. The invention defined in claim 3 further comprising support means for positioning a print medium to receive light exiting said third light polarizing means.

9. The invention defined in claim 3 further comprising a display surface, support means for positioning a print medium and means for directing light exiting from third polarizing means to said display surface and/or a positioned print medium.

10. The invention defined in claims 7 or 9 further comprising means for reading a record containing data indicative of a plurality of images and for producing an electrical signal indicative of said images and signal processing means for coupling said electrical signal to said addressing means.

11. The invention defined in claim 10 further comprising signal storage means for storing the signals indicative of one of image and for repeatedly applying said signals to said addressing means.

12. The invention defined in claims 1, 2 or 3 wherein said second polarizing means comprises a plurality of polarizers having their directions of polarization mutually aligned.

13. Electronic imaging apparatus comprising:
(a) first and second light-valve, area arrays, each array comprising a plurality of parallel strip portions which are activatable between birefringent and isotropic states in response to application and removal of an electric field, said area arrays being aligned along an optical axis in an optically opposed relation with their respective said strip portions generally orthogonal optically;
(b) first and second addressable activating means respectively for selectively applying discrete electrical fields transversely across respective strip portions of said first and second arrays;
(c) first, second and third light polarizing means aligned along said optical axis so that said first array is optically between said first and second polarizing means and said second array is optically between said second and third polarizing means, said first and third polarizing means being optically oriented with their directions of polarization generally aligned and parallel to the plane of said arrays and said second polarizing means being optically oriented with its direction of polarization generally parallel to the plane of said arrays and orthogonal to those of said first and third polarizing means;
(d) means for producing a plurality of light illumination periods, each of a different color, wherein such light is directed along said optical axis so as to illuminate said arrays;
(e) first addressing means coupled to first activating means for applying an electrical field across individual strip portions of said first array in a predetermined sequential order; and
(f) second addressing means for applying electrical fields to the strip portions of said second array in timed relation with the sequential activations of said one array and in accordance with an electrical signal containing a line of image information.

* * * * *